(12) United States Patent
Ahmed

(10) Patent No.: US 12,523,195 B1
(45) Date of Patent: Jan. 13, 2026

(54) WIND TURBINE BLADE MADE WITH DATE PALM TREE MATERIAL

(71) Applicant: KING SAUD UNIVERSITY, Riyadh (SA)

(72) Inventor: Yasser Fouad Ahmed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 38 days.

(21) Appl. No.: 19/059,745

(22) Filed: Feb. 21, 2025

Related U.S. Application Data

(62) Division of application No. 18/969,860, filed on Dec. 5, 2024.

(51) Int. Cl.
*F03D 1/06* (2006.01)

(52) U.S. Cl.
CPC ........ *F03D 1/0675* (2013.01); *F05B 2220/30* (2013.01); *F05B 2230/23* (2013.01); *F05B 2240/21* (2013.01); *F05B 2240/30* (2013.01)

(58) Field of Classification Search
CPC .... F03D 1/0675; F03D 1/0677; F03D 1/0679; F03D 1/0681; F03D 1/0682; F03D 1/0684; F03D 1/0685; F03D 1/0687; F03D 1/0688; F03D 1/069; F03D 80/301; F05D 2220/30; F05D 2230/23; F05D 2240/21; F05D 2240/30; B29C 70/30; B29L 2031/085
See application file for complete search history.

(56) References Cited

U.S. PATENT DOCUMENTS

| 2007/0107220 A1* | 5/2007 | Bakhuis | F03D 1/0675 29/889.7 |
| 2008/0159871 A1* | 7/2008 | Bech | F03D 1/0675 416/241 A |
| 2008/0219851 A1* | 9/2008 | Althoff | F03D 1/0675 29/889.71 |

(Continued)

FOREIGN PATENT DOCUMENTS

| CN | 1016186606 A | | 1/2010 | |
| CN | 105670223 A | * | 6/2016 | ......... C08G 59/5013 |
| KR | 20110116288 A | * | 10/2011 | |

OTHER PUBLICATIONS

Gomes et al. The Petiole of the Miriti Palm: A sustainable material for wind turbine blades?, Journal of Physics: Conference Series 2767 (2024) 082007, pp. 1-9 (Year: 2024).*

(Continued)

*Primary Examiner* — Nathaniel E Wiehe
*Assistant Examiner* — Wayne A Lambert
(74) *Attorney, Agent, or Firm* — Nath, Goldberg & Meyer; Joshua B. Goldberg

(57) ABSTRACT

A method forming a wind turbine blade includes forming a first shell of the wind turbine blade, the first shell having a first exterior side surface, a first interior side surface, and a first mating side surface connecting the first interior and first exterior side surfaces to one another, forming a second shell of the wind turbine blade, the second shell having a second exterior side surface, a second interior side surface, and a second mating side surface connecting the second interior and second exterior side surfaces to one another, and connecting the first and second mating side surfaces to one another to form the wind turbine blade. The first and second shells include date palm tree material and epoxy.

19 Claims, 5 Drawing Sheets

(56) References Cited

U.S. PATENT DOCUMENTS

| | | | |
|---|---|---|---|
| 2009/0273111 A1* | 11/2009 | Bansal | B29C 70/443 264/101 |
| 2010/0062238 A1* | 3/2010 | Doyle | B29C 70/02 416/223 R |
| 2010/0135819 A1* | 6/2010 | Hibbard | B29C 70/14 703/2 |
| 2010/0143145 A1* | 6/2010 | Jones | B32B 5/12 428/114 |
| 2011/0031758 A1* | 2/2011 | Mitsuoka | B32B 25/10 29/889.6 |
| 2011/0171024 A1* | 7/2011 | Jensen | F03D 3/062 416/233 |
| 2011/0176928 A1* | 7/2011 | Jensen | F03D 3/062 416/233 |
| 2011/0221093 A1* | 9/2011 | Perrow | B29C 70/44 425/89 |
| 2014/0119940 A1* | 5/2014 | Krishnamurthy | F03D 1/0675 29/889.7 |
| 2014/0166208 A1* | 6/2014 | Schubiger | B29C 66/1122 156/468 |
| 2017/0259512 A1* | 9/2017 | Wielaender | F03D 3/062 |
| 2018/0223798 A1* | 8/2018 | Caruso | B29D 99/0025 |
| 2023/0415882 A1* | 12/2023 | Bert | B64C 11/008 |

OTHER PUBLICATIONS

Miri et al. The effect of recycled date palm tree fibers on the impact fatigue and residual static strength of adhesively bonded joints, Composite Structures 327 (2024) 117664, pp. 1-18 (Year: 2023).*

Gherissi, Abderraouf, et al, "Wind turbine blades structure based on palm cellulose fibers composite material", Epitoanyag (Online) 3 (2021); pp. 109-114.

Gherissi, Abderraouf, et al "A study of wind turbine blade structure based on cellulose fibers composite material" Proc. Eng. Technol—PET 38 (2018) 80-85.

Fei, Liang Yeng "Development of Wind Turbine Blades /Based on Hybrid Bio-Composites" Diss Universiti Sains Malaysia, 2017.

Belfkira, Z, H. Hounir, A El Marjani, "Structural optimization of a horizontal axis wind turbine blade made from new hybrid composites with kenaf fibers", Composite Structures 260 (2021); 113252.

Samuel, Bassey, Malachy Sumalia and Basar Dan-Asabe, "Potential natural fiber polymer composites for wind turbine blade development a short review" Junal Mekanikal (2022) 1-14.

* cited by examiner

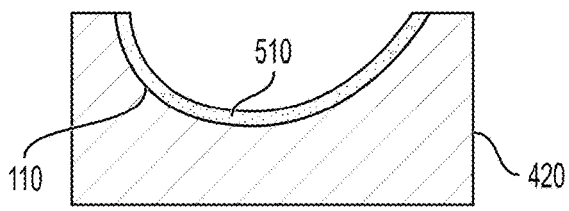
FIG. 5A
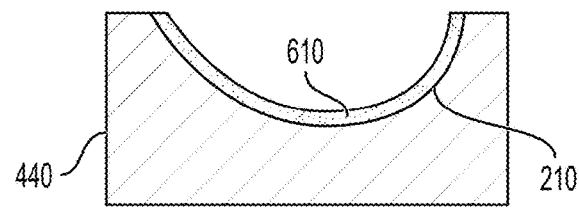
FIG. 6A
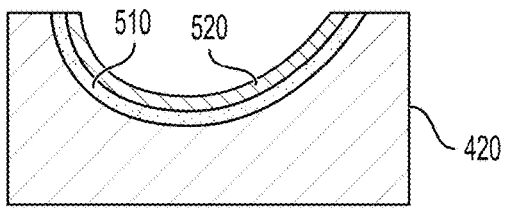
FIG. 5B
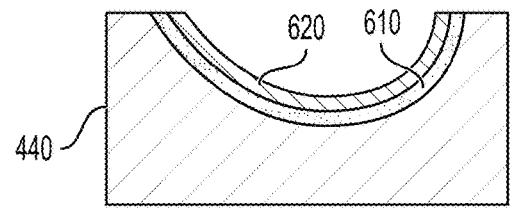
FIG. 6B
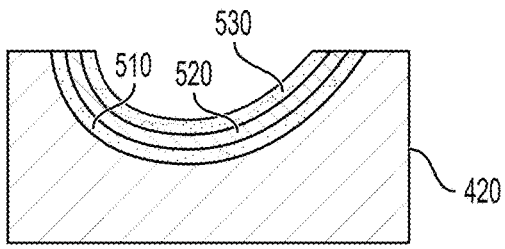
FIG. 5C
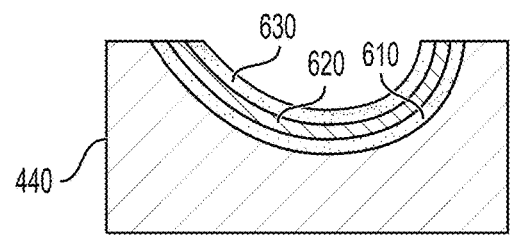
FIG. 6C
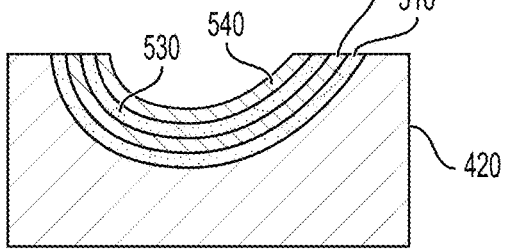
FIG. 5D
FIG. 6D
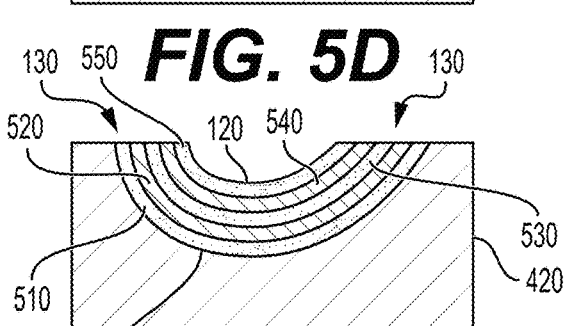
FIG. 5E
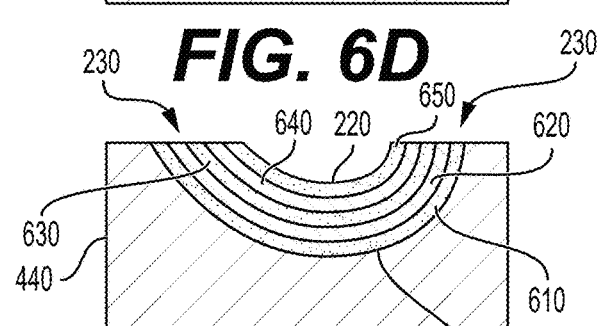
FIG. 6E

WIND TURBINE BLADE MADE WITH DATE PALM TREE MATERIAL

CROSS-REFERENCE TO RELATED APPLICATION

This application is a divisional of U.S. patent application Ser. No. 18/969,860, filed on Dec. 5, 2024, the entire contents of which are incorporated herein by reference.

TECHNICAL FIELD

The present disclosure relates to wind turbines, and more particularly, to a wind turbine blade made with date palm tree material.

DISCUSSION OF THE RELATED ART

Wind turbines are used to generate electrical power from wind. As demand for the production of renewable electrical power increases, the production of wind turbines has also been increasing. However, wind turbines have a finite life span, and their blades are generally considered to be non-recyclable at the end of the turbine's life. Therefore, the ongoing production and installation of wind turbines is expected to significantly contribute to the filling of landfills with wind turbine blades in the foreseeable future.

SUMMARY

The present disclosure relates to a method of manufacturing wind turbine blades from environmentally-friendly materials. Specifically, the present subject matter relates to a method of manufacturing wind turbine blades with natural material obtained from date palm trees (*Phoenix dactylifera*).

The date palm tree material may be, for example, leaflets obtained from the leaves of date palms, roots obtained from date palms and fibrous material obtained from the outer portion of the trunk of date palm trees. The date palm material may be combined with epoxy to form the upper and lower shells of a wind turbine blade. The substitution of conventional blade material, such as a metal, fiberglass, carbon fiber, etc., with date palm tree matter reduces the amount of non-renewable material that must be produced by factories to create the wind turbine blades. In addition, the substitution of conventional blade material with date palm tree matter reduces the amount of non-renewable material will be landfilled at the end of a turbine's life.

Therefore, the method of the present subject matter can be used to reduce the carbon emission resulting from the production of the wind turbine blades and to reduce the amount of non-renewable material landfilled at the end of a turbine's life.

BRIEF DESCRIPTION OF THE DRAWINGS

The above and other features of the present disclosure will become more apparent by describing in detail exemplary embodiments thereof in conjunction with the accompanying drawings, in which:

FIGS. 5A-5E, respectively, are cross-sectional views illustrating a method of forming the first shell of the wind turbine blade of FIG. 1 by using the first mold;

FIGS. 6A-6E, respectively, are cross-sectional views illustrating a method of forming the second shell of the wind turbine blade of FIG. 1 by using the second mold.

DETAILED DESCRIPTION OF THE EMBODIMENTS

Figure 1:
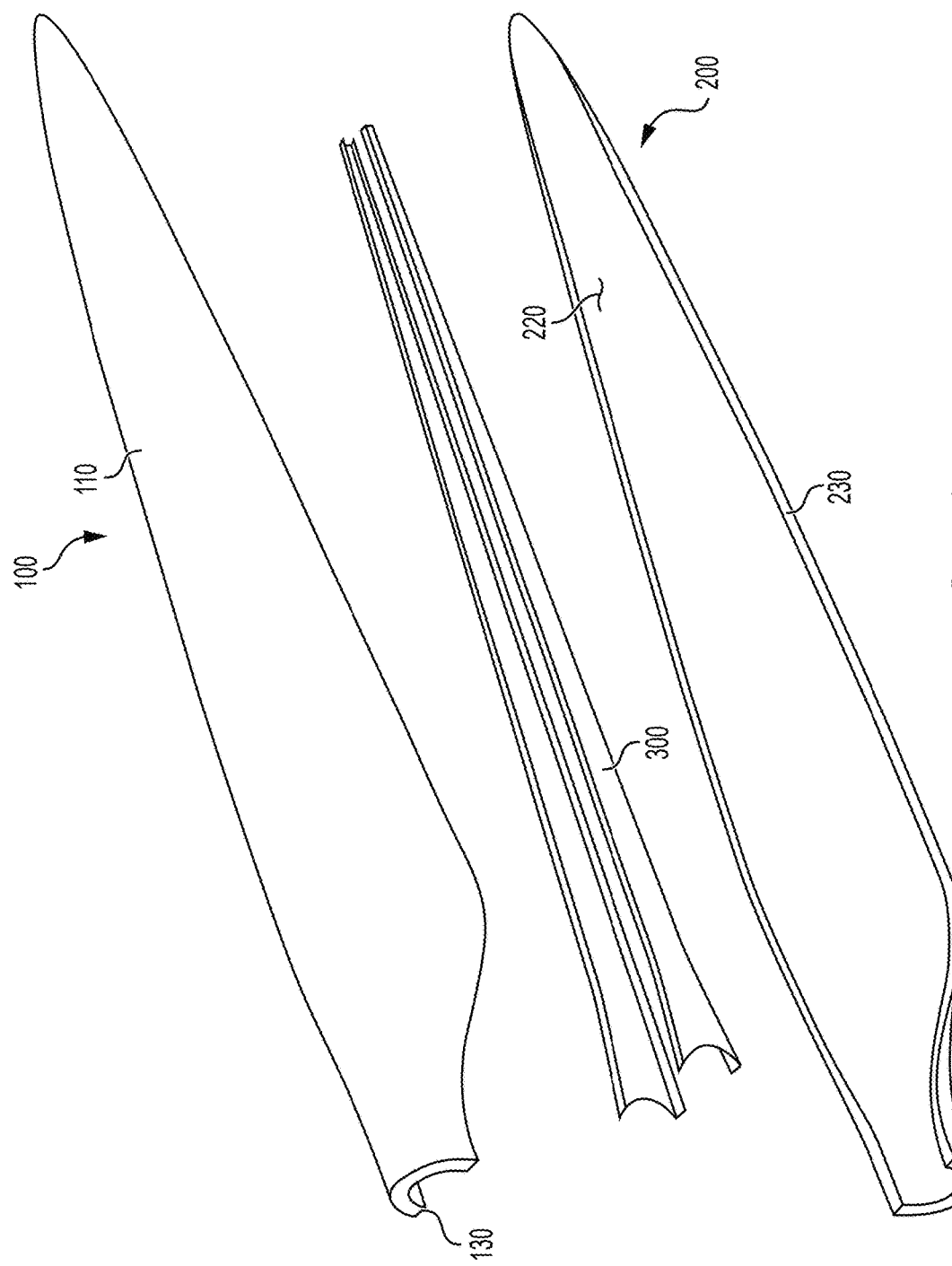
FIG. 1 is an exploded perspective view illustrating a wind turbine blade according to an embodiment of the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Figure 2:
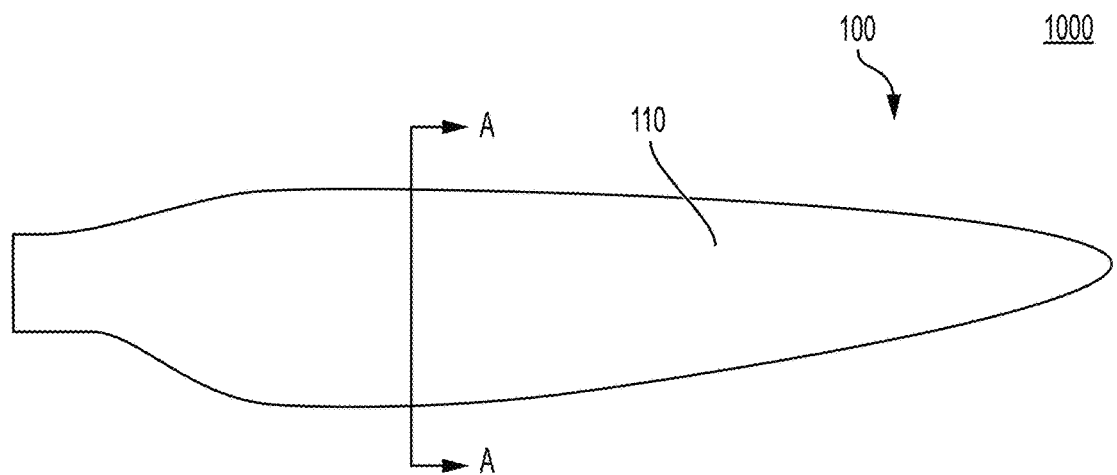
FIG. 2 is a top plan view illustrating the wind turbine blade of FIG. 1.
Figure 3:
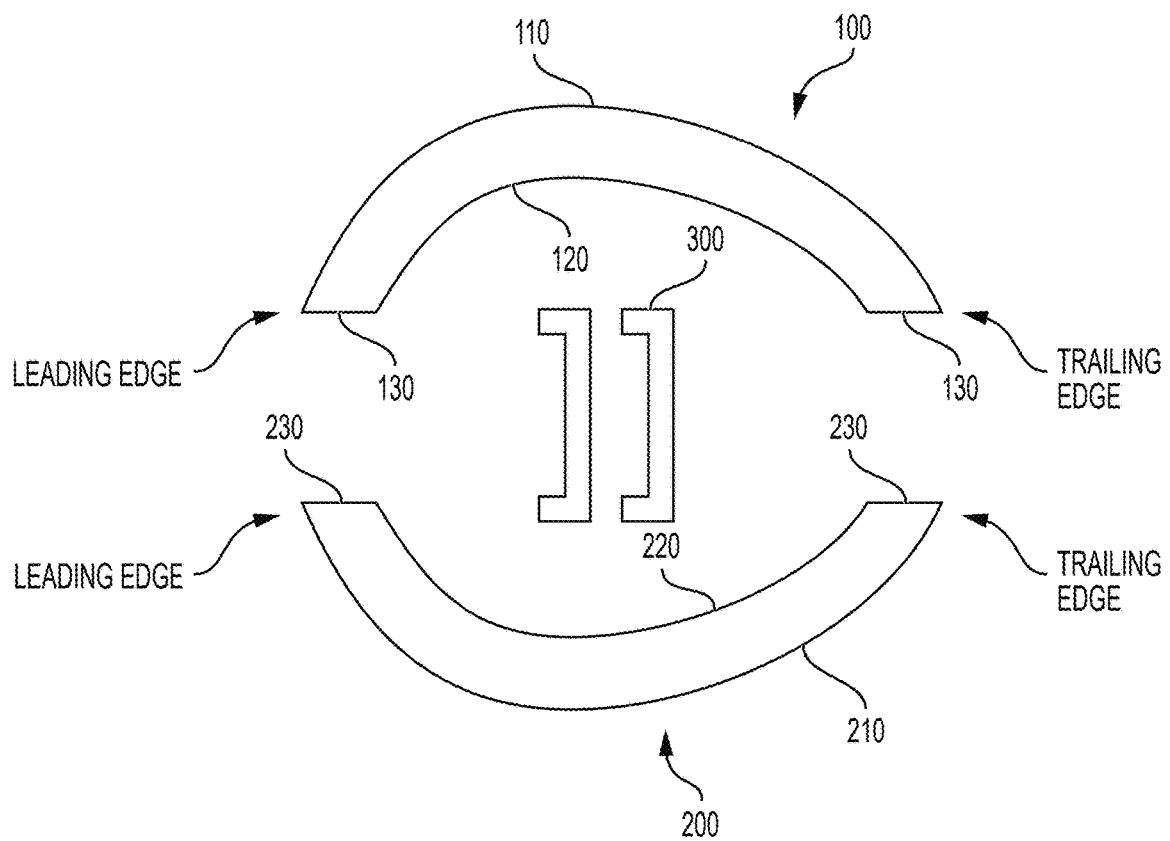
FIG. 3 is an exploded cross-sectional view taken along line A-A of FIG. 2.

Referring to FIGS. 1-3, a wind turbine blade 1000 in accordance with an embodiment of the present subject matter includes a first shell (or aeroshell) 100 and a second shell 200 connected to the first shell 100. The wind turbine blade 1000 may also include a plurality of shear webs 300 extending in a length direction of the first and second shells 100, 200, and connected to the first and second shells 100, 200 in an interior of the wind turbine blade 100, along the respective lengths of first and second shear webs 300.

The first shell 100 may be, for example, an upper shell of the wind turbine 1000. In this case, the second shell 200 may be a lower shell of the wind turbine 1000.

Referring to FIG. 3, the first shell 100 has a first exterior side surface 110, a first interior side surface 120, and a first mating side surface 130 connecting the first interior and first exterior side surfaces 120, 110 to one another along a periphery of the first shell 100.

The second shell 200 has a second exterior side surface 210, a second interior side surface 220, and a second mating side surface 230 connecting the second interior and second exterior side surfaces 220, 210 to one another along a periphery of the second shell 200.

As can be gathered with reference to FIGS. 1-3, the first and second mating side surfaces 130, 230 are connected to one another, the first and second exterior side surfaces 110, 210 define an exterior of the wind turbine blade 1000, and the first and second interior side surfaces 120, 220 define an interior chamber of the wind turbine blade 1000.

The first and second shells 100, 200 include date palm tree (*Phoenix dactylifera*) material and epoxy. The epoxy is the binder holding the date palm tree material together. The date palm tree material included in the first shell 100 is of the same kind as the date palm tree material included in the second shell 200.

A weight ratio of the date palm tree material included in the first shell 100 to the epoxy included in the first shell 100 ranges from about 150:200 to about 450:300. A weight ratio of the date palm tree material included in the second shell 200 to the epoxy included in the second shell 200 ranges from about 150:200 to about 450:300.

The first and second shear webs 300 are preferably made of wood to increase the amount of renewable material used in constructing the wind turbine blade 1000. Alternatively, or in addition, the first and second shear webs 300 may be made of a metal, an elastomeric material, a composite material, or a combination thereof.

Figure 4B:
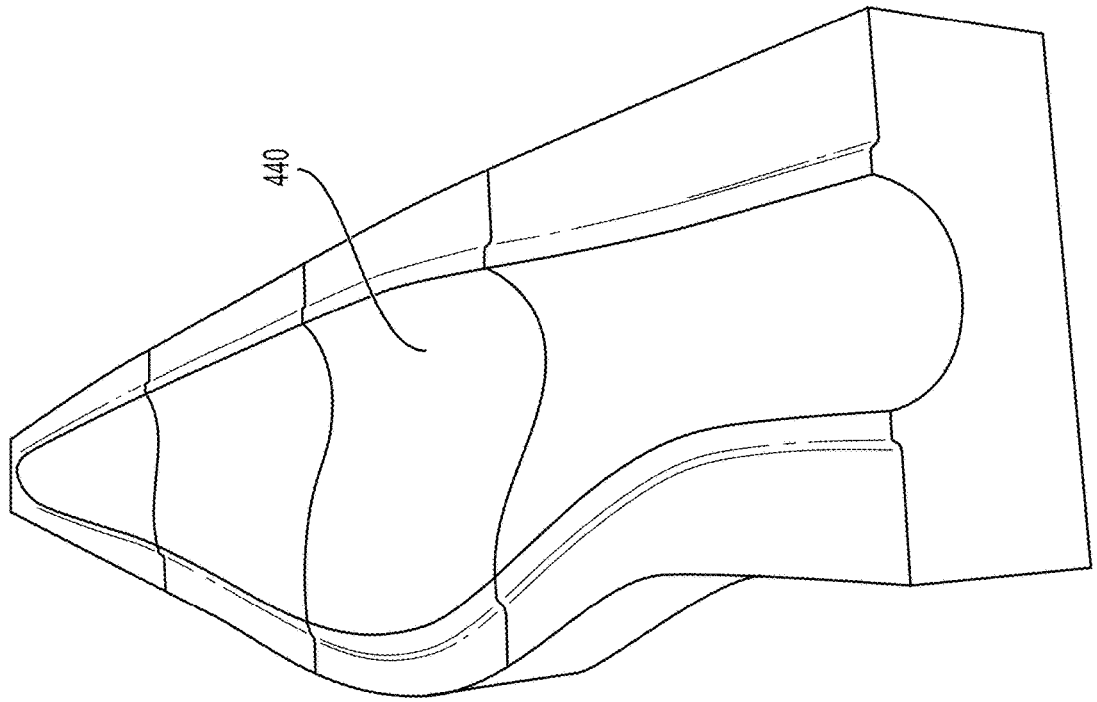
FIG. 4B is a perspective view illustrating a second mold usable for forming a second shell of the wind turbine blade of FIG. 1.
Figure 4A:
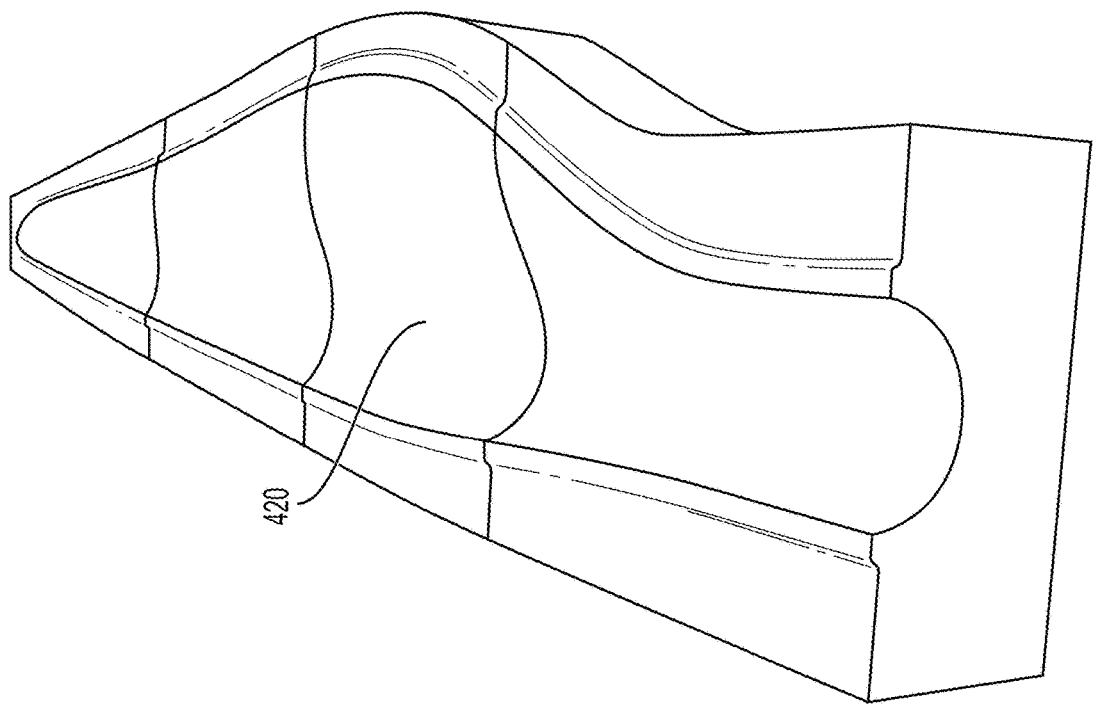
FIG. 4A is a perspective view illustrating a first mold usable for forming a first shell of the wind turbine blade of FIG. 1.

FIGS. 4A and 4B, respectively, illustrate a first mold 420 and a second mold 440. The first mold 420 is used for forming the first shell 100. The second mold 440 is used for forming the second shell 200.

A method of manufacturing the wind turbine blade 1000 will be described with reference to FIGS. 4A-4B, 5A-5E, 6A-6E and 7.

The method of manufacturing the wind turbine blade 1000 includes forming the first shell 100. The forming of the first shell 100 will be described with reference to FIGS. 5A-5E.

Referring to FIG. 5A, the forming of the first shell 100 includes obtaining the first mold 420 The first mold 420 defines a shape of the first shell 100.

Referring to FIG. 5A, the method of forming the first shell 100 includes forming a first layer 510 of date palm tree material in the first mold 420. The first layer 510 of date palm tree material defines the first exterior side surface 110 of the first shell 100. When the exterior of the first shell 100 includes an additional coating, for example, a paint layer, etc., the additional coating defines the first exterior surface of the first shell 100. In this case, the first layer 510 is proximate to the first exterior side surface of the first shell 100.

The date palm tree material forming the first layer 510 includes a plurality of date palm tree leaflet pieces. For example, the first layer 510 may be made solely of date palm tree leaflet pieces.

Prior to the forming of the first layer 510, the date palm tree leaflet pieces may need to be acquired and processed to be suitable for forming the first layer 510. In this case, a method of the present subject matter may include collecting date palm tree material (i.e., leaflets), washing the collected date palm tree leaflets to form washed date palm tree leaflets, cutting the washed date palm tree leaflets to form a plurality of cut pieces of date palm tree leaflets, and drying the plurality cut pieces of date palm tree leaflets to form dried and cut pieces of date palm tree material (i.e., dried and cut pieces of date palm tree leaflets). The dried and cut pieces of date palm tree leaflets may be deposited in the first mold 420 to form the first layer 510 of date palm tree material, as illustrated in FIG. 5A.

The date palm tree leaflets should be obtained without harming the donor tree(s). For example, the date palm tree leaflets can be obtained by collecting leaves that a date palm tree has naturally dried (e.g., dead leaves), and/or by collecting old but live leaves that a date palm tree will subsequently dry in the natural course of growing new leaves and drying the old leaves.

The collected leaves should be washed to remove any external foreign matter from their outer surfaces. For example, the washing process should remove soil/sand particles, oil, grease and/or any other contaminants that may be present on the leaves.

When live leaves are collected, the leaves (and more specifically, the leaflets of the leaves) must be dried out, either before or after the washing process, before being usable as material for forming the first layer 510. This is to reduce or substantially eliminate the moisture/water content that is present in live leaves, including the leaflets.

The drying process can be done naturally, for example, by placing the leaves in direct sunlight, in a shaded environment, or in a climate-controlled controlled environment to enable the leaves to air dry. Alternatively, the drying process may include inserting the leaves in a heating chamber (e.g., in a lab furnace or other suitable furnace/oven), and raising the temperature of the heating chamber up to 75° C. for a maximum of 24 hours. The leaves are then removed from the heating chamber, and are deemed to be sufficiently dry.

The leaflets can then be removed from the rachis of the leaves that have been washed and dried. The removed leaflets can vary in size length due to the natural shape of date palm tree leaves.

In an approach, the leaflets can be used in their natural length, as obtained from the leaves, to form the first layer 510 of date palm tree material (i.e., to produce the date palm tree leaflet pieces that are used in forming the first layer 510). That is, the leaflets are cut from the rachis and are deposited in the first mold 420 in their natural shape and size, as cut from the rachis, to form the first layer 510.

In another approach, the leaflets are cut to a certain size range after being removed from the leaves. As an example, the leaflets can be cut along their length to form leaflet pieces that have a size ranging from about 2 to about 3 cm in length. The cutting can be carried out, for example, in the width direction of the leaflets. Therefore, the about 2 to about 3 cm length of the leaflet pieces is measured in the grain direction (or length direction) of the leaflets.

In both approaches, the thickness and width of the leaflets is not altered from their natural shape and size. Stated otherwise, the leaflets may or might not be cut down to a shorter length, but are otherwise used as obtained from the tree after being washed and/or dried.

The forming of the first layer 510 may include depositing, for example, from 50 g of date palm leaflets per m$^2$ of the first mold 420 to 150 of date palm leaflets per m$^2$ of the first mold 420.

When forming the wind turbine blade 1000 in a small scale, the forming of the first layer 510 includes evenly depositing from about 50 grams to about 150 grams of date palm tree leaflet pieces in the first mold 420, covering the entire area of the first mold 420 that forms the first shell 100.

Referring to FIG. 5B, the method of forming the first shell 100 includes forming a second layer 520 of epoxy on the first layer 510 of date palm tree material. The forming of the second layer 520 includes applying epoxy in a flowable form (or flowable state) on the first layer 510 via a brush, roller, a spray gun, etc., to evenly distribute the epoxy on the first layer 510. The brush, roller or other tool can be used to press the epoxy of the second layer 520 toward the first layer 510 to thoroughly wet the leaflets of the first layer 510 with epoxy and to eliminate or reduce air bubbles in the wet leaflets.

The epoxy used in forming the second layer 520 includes epoxy resin mixed with a hardener. The epoxy resin and hardener may be conventional epoxy material. A weight ratio of resin to hardener in the second layer 520 of epoxy can be 2:1, 3:2 or 5:3. That is, the second layer 520 includes more resin than hardener.

The resin and hardener included in the second layer 520 should have a relatively long setting (or hardening) time such that the second layer 520 remains in flowable form (or wet) during the layup of all of the subsequent layers that form the first shell 100.

In the small scale embodiment of the wind turbine blade 1000, as described above, the forming of the second layer 520 includes depositing from about 100 grams of epoxy to about 150 grams of epoxy on the first layer 510.

Therefore, a weight ratio of date palm tree material (e.g., date palm leaflets) included in the first layer 510 of date palm tree material and epoxy included in the second layer 520 of epoxy ranges from about 50:100 to about 150:150.

Referring to FIG. 5C, the method of forming the first shell 100 includes forming a third layer 530 of date palm tree material on the second layer of epoxy. The third layer 530 is identical to the first layer 510 in all aspects. Therefore, a detailed description of a method of forming the third layer 530 may be omitted to avoid duplicity of information. However, and to state information that can be derived based on the teaching that the third layer 530 is identical to the first layer 510 in all aspects, a weight ratio of date palm tree material included in the third layer 530 of date palm tree material (i.e., date palm tree leaflet pieces) and epoxy included in the second layer 520 of epoxy ranges from about 50:100 to about 150:150.

The third layer 530 must be formed on the second layer 520 of epoxy while the second layer 520 of epoxy is flowable (or wet).

Referring to FIG. 5D, the method of forming the first shell 100 includes forming a fourth layer 540 of epoxy on the third layer 530 of date palm tree material. The fourth layer 540 is identical to the second layer 520 in all aspects. Therefore, a detailed description of a method of forming the fourth layer 540 may be omitted to avoid duplicity of information. However, and to state information that can be derived based on the teaching that the fourth layer 540 is identical to the second layer 520 in all aspects, a weight ratio of date palm tree material included in the third layer of date palm tree material 530 and epoxy included in the fourth layer 540 of epoxy ranges from about 50:100 to about 150:150.

The fourth layer 540 of epoxy must be formed on the third layer 530 of date palm material while the second layer 520 of epoxy is flowable (or wet). A brush, roller or other tool can be used to press the epoxy of the fourth layer 540 toward the third layer 530 to thoroughly wet the leaflets of the third layer 510 with epoxy and to eliminate or reduce air bubbles in the wet leaflets of the third layer 530.

Referring to FIG. 5E, the method of forming the first shell 100 includes forming a fifth layer 550 of date palm tree material on the fourth layer 540 of epoxy. The fifth layer 550 is identical to the first and third layers 510, 530 in all aspects. Therefore, a description of a method of forming the fifth layer 550 may be omitted to avoid duplicity of information.

The fifth layer 550 defines the first interior side surface 120 of the first shell 100, or is proximate to the first interior side surface 120 of the first shell (such as when the exterior of the fifth layer 550 is painted). The fifth layer 550 is distal to the first exterior side surface 110 of the first shell 100.

However, and to state information that can be derived based on the teaching that the fifth layer 550 is identical to the first and third layers 510, 530 in all aspects, a weight ratio of date palm tree material (date palm tree leaflet pieces) included in the fifth layer 550 of date palm tree material and epoxy included in the fourth 540 layer of epoxy ranges from about 50:100 to about 150:150.

The fifth layer 550 of date palm material must be formed on the fourth layer 540 of epoxy while the fourth layer 540 of epoxy is flowable and while second layer 520 of epoxy is flowable.

A brush, roller or other tool can be used to press the leaflets of the fifth layer 550 toward the fourth layer 540 of epoxy to thoroughly wet the leaflets of the fifth layer 510 with epoxy and to eliminate or reduce air bubbles in the wet leaflets of the fifth layer 550. Therefore, the second and fourth layers 520, 540 of epoxy will wet (or permeate into) the first, third and fifth layers 510, 530 and 550 of date palm material. As a result, the first to fifth layers 510-550 will cure as one unit, in virtually the same time frame. The result of the curing of the first to fifth layers 510-550 produces the first shell 100. The first shell 100 can be removed from the mold 420 when the curing of the first to fifth layer 510-550 is complete.

The first shell 100, due to its composition, may have a weight ratio of the date palm tree material to the epoxy in the range of about 150:200 to about 450:300. This is because the first, third and fifth layers 510, 530 and 550 of date palm material may weigh from about 50 grams to about 150 grams each, and the second and fourth layers 520 and 540 of epoxy may weight from about 100 grams to about 150 grams each.

As indicated in this specification, the first shell 100 may be an upper shell of the wind turbine blade 1000. Therefore, the first shell 100 may have a longer path of air travel between the leading edge and trailing edge thereof than the second shell 200, as illustrated in FIG. 3. The mold 420 is shaped to form the first shell 100 with a longer air travel path between the leading edge and trailing edge thereof than the second shell 200.

The method of manufacturing the wind turbine blade 1000 includes forming the second shell 200. The forming of the second shell 200 will be described with reference to FIGS. 6A-6E.

The layup process of forming the second shell 200 is virtually identical to the layup process of forming the first shell 100, as described in this specification. Therefore, aspects of the manufacturing process of the second shell 200, materials used in forming the second shell 200 and/or weight ratios of the materials used in forming the second shell 200 not described with reference to FIGS. 6A-6E, respectively, may be presumed to be the same as corresponding aspects of the manufacturing process of the first shell 100, the same as corresponding materials used in forming the first shell 100, and the same as corresponding weight ratios described with reference to the manufacturing of the first shell 100.

Referring to FIG. 6A, the forming the second shell 200 includes forming a first layer 610 of date palm tree material (i.e., date palm leaflet pieces) in the second mold 440. The first layer 610 of date palm tree material defines the second exterior side surface 210 of the second shell 200.

When the exterior of the second shell 200 includes an additional coating, for example, a paint layer, etc., the additional coating defines the second exterior surface of the second shell 200. In this case, the first layer 610 is proximate to the second exterior side surface of the second shell 200.

The forming of the first layer 610 is identical to the forming of the first layer 510, the difference being that the first layer 610 is formed in the second mold 440, and the first layer 510 is formed in the first mold 420.

When forming the wind turbine blade 1000 in a small scale, as described in this specification, the forming of the first layer 610 includes evenly depositing from about 50 grams to about 150 grams of date palm tree leaflet pieces in the second mold 440, covering the entire area of the second mold 440 that forms the second shell 200.

Referring to FIG. 6B, the method of forming the second shell 200 includes forming a second layer 620 of epoxy on the first layer 610 of date palm tree material. The forming of the second layer 620 includes applying epoxy in a flowable form on the first layer 610 via a brush, roller, a spray gun, etc., to evenly distribute the epoxy on the first layer 610.

The weight ratio of resin to hardener in the second layer 620 of epoxy can be 2:1, 3:2 or 5:3. The resin and hardener included in the second layer 620 should have a relatively long setting (or hardening) time such that the second layer 620 remains in flowable form (or wet) during the layup of all of the subsequent layers that form the second shell 200.

In the small scale embodiment of the wind turbine blade 1000, as described above, the forming of the second layer 620 includes depositing from about 100 grams of epoxy to about 150 grams of epoxy on the first layer 610.

Therefore, a weight ratio of date palm tree material (e.g., date palm leaflet pieces) included in the first layer 610 of date palm tree material and epoxy included in the second layer 620 of epoxy ranges from about 50:100 to about 150:150.

Referring to FIG. 6C, the method of forming the second shell 200 includes forming a third layer 630 of date palm tree material on the second layer of epoxy. The third layer 630 is identical to the first layer 610 in all aspects. A weight ratio of the date palm tree material included in the third layer 630 and epoxy included in the second layer 620 ranges from about 50:100 to about 150:150.

The third layer 630 must be formed on the second layer 620 of epoxy while the second layer 620 of epoxy is flowable (or wet).

Referring to FIG. 6D, the method of forming the second shell 200 includes forming a fourth layer 640 of epoxy on the third layer 630 of date palm tree material. The fourth layer 640 is identical to the second layer 620 in all aspects. A weight ratio of date palm tree material included in the third layer 630 of date palm tree material and epoxy included in the fourth layer 640 ranges from about 50:100 to about 150:150.

The fourth layer 640 of epoxy must be formed on the third layer 630 of date palm material while the second layer 620 of epoxy is flowable (or wet).

Referring to FIG. 6E, the method of forming the second shell 200 includes forming a fifth layer 650 of date palm tree material on the fourth layer 640 of epoxy. The fifth layer 650 is identical to the first and third layers 510, 530 in all aspects. A weight ratio of date palm tree material included in the fifth layer 650 of date palm tree material and epoxy included in the fourth 540 layer of epoxy ranges from about 50:100 to about 150:150.

The fifth layer 650 defines the second interior side surface 220 of the second shell 200, or is proximate to the second interior side surface 220 of the second shell 200 (such as when the exterior of the fifth layer 650 is painted). The fifth layer 650 is distal to the second exterior side surface 210 of the second shell 200.

The fifth layer 650 of date palm material (i.e., leaflet pieces) must be formed on the fourth layer 640 of epoxy while the fourth layer 640 of epoxy is flowable and while second layer 620 of epoxy is flowable.

Therefore, the second and fourth layers 620, 640 of epoxy will wet (or permeate into) the first, third and fifth layers 610, 630 and 650 of date palm material. As a result, the first to fifth layers 610-650 will cure as one unit, in virtually the same time frame. The result of the curing of the first to fifth layers 610-650 produces the second shell 200. The second shell 200 can be removed from the second mold 440 when the curing of the first to fifth layer 610-650 is complete.

The second shell 200, due to its composition, may have a weight ratio of the date palm tree material to the epoxy in the range of about 150:200 to about 450:300. This is because the first, third and fifth layers 610, 630 and 650 of date palm material may weigh from about 50 grams to about 150 grams each, and the second and fourth layers 520 and 540 of epoxy may weight from about 100 grams to about 150 grams each.

As indicated in this specification, the second shell 200 may be a lower shell of the wind turbine blade 1000. Therefore, the second shell 200 may have a shorter path of air travel between the leading edge and the trailing edge thereof than the second shell 200, as illustrated in FIG. 3. The second mold 440 is shaped to form the second shell 200 with a shorter air travel path between the leading edge and the trailing edge thereof than the first shell 200.

Figure 7:
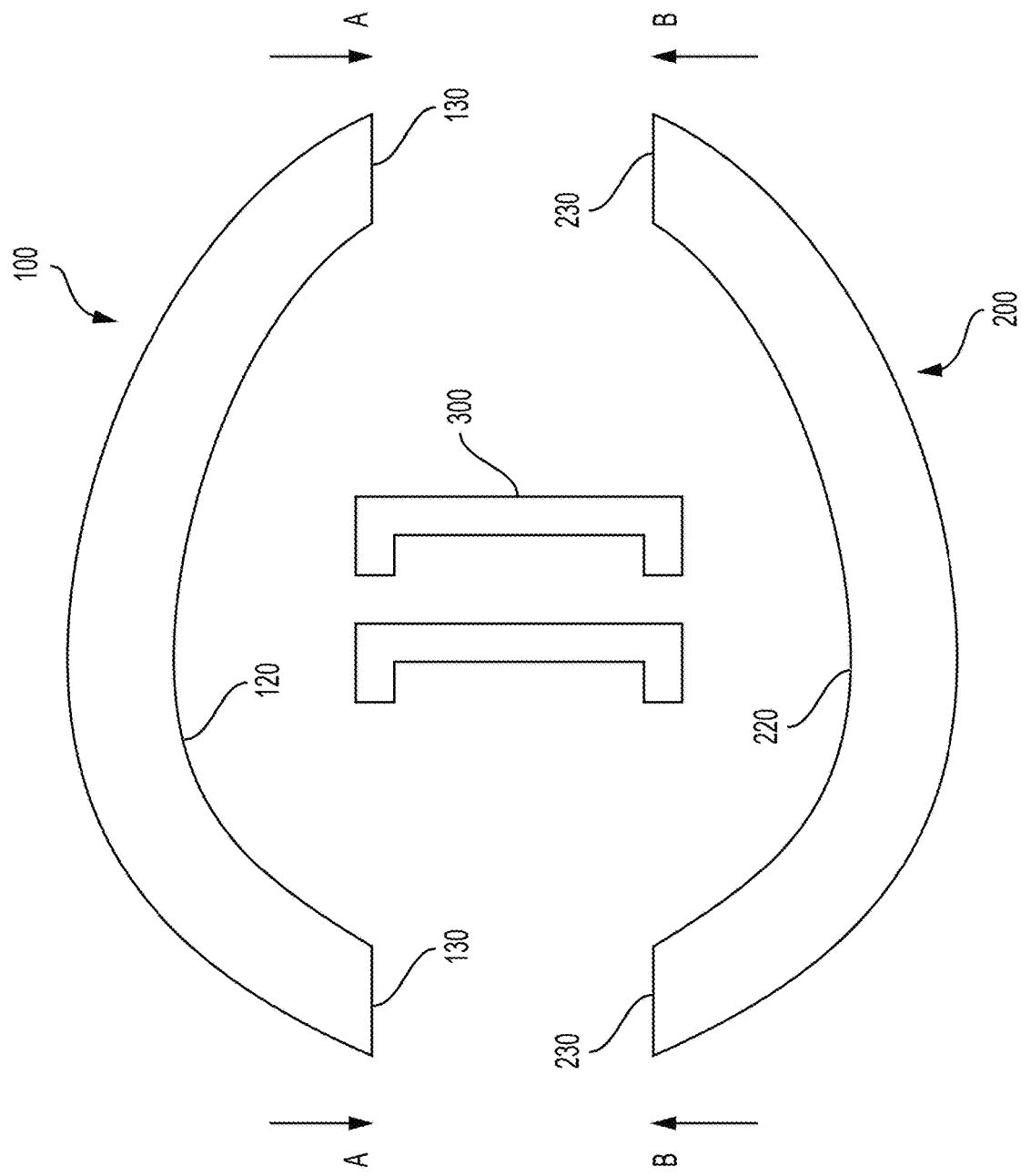
FIG. 7 is a cross-sectional view illustrating a method of forming the wind turbine blade of FIG. 1 by joining its components to one another.

The method of manufacturing the wind turbine blade 1000 includes connecting the first and second mating side surfaces 130, 230 to one another to form the wind turbine blade 1000. FIG. 7 illustrates the process of aligning the first and second shells 100, 200, with the first and second mating side surfaces 130, 230 facing one another, and moving the first and second shells 100, 200 toward one another, as indicated by the arrows A and B in FIG. 7, to connect the first and second shells 100, 200 to one another.

An adhesive may be applied on the first and second mating side surfaces 130, 230 to connect the first and second shells 100, 200 to one another. The adhesive may be, for example, epoxy. Alternatively, or in addition, fasteners may be used to connect the first and second shells 100, 200 to one another.

The method of manufacturing the wind turbine blade 1000 may include disposing a pair of shear webs 300 between the first interior side surface 110 of the first shell 100 and the second interior surface 220 of the second shell 200 prior to the connecting of the first and second mating side surfaces 130, 230 to one another. The method of manufacturing the wind turbine blade 1000 may include connecting the pair of shear webs 300 to said first and second interior side surfaces 120, 220 prior to or simultaneously with the connecting of the first and second mating side surfaces 130, 230 to one another.

The wind turbine blade 1000 may then be painted, if desired. A plurality of wind turbine blades 1000, formed in accordance with the teachings of this specification, can be connected to a hub of a wind turbine to cause the hub to rotate, and therefore, generate electricity.

A wind turbine blade 1000A (see FIG. 1) may be similar to the wind turbine blade 1000 in all aspects except for the parts of a date palm tree used in forming the wind turbine blade 1000A. That is, the wind turbine blade 1000 is formed by using leaflets (or leaflet pieces) obtained from date palm trees. On the other hand, the wind turbine blade 1000A is formed by using the roots of a date palm tree.

A method of forming the wind turbine blade 1000A may be the same as the method described in this specification for forming the wind turbine blade 1000, with the exception of substituting the leaflets with root material obtained from date palm trees. Therefore, the description below will focus on the differences between forming of the turbine blade 1000A and forming the turbine blade 1000. All other forming steps not described in detail below may be presumed to be the same as corresponding steps described with reference to the forming of the turbine blade 1000.

The material used for forming the first layers 510, 610, the third layers 530, 630, and the fifth layers 550, 650 of the turbine blade 1000A is date palm tree roots (or date palm tree root material). The roots may be obtained (or collected) from exposed parts of the root system of date palm trees. Importantly, the amount of root material obtained from each date palm tree must be such that the tree is not harmed to a significant degree.

The obtained root material may be washed and dried as described elsewhere in this specification. However, the washed and dried roots are then cut to a size range of about 0.5 mm to about 1 mm in length. That is, the diameter of the roots is kept in its natural size (which can vary along the length of the roots). The roots are cut along their length (akin to a cross-sectional cut) to form root pieces that range from about 0.5 to about 1 mm in length (in the direction of the grain).

All other aspects of forming the first and second shells of the wind turbine blade 1000A and connecting the first and second shells of the wind turbine blade 1000A to one another may be the same as or similar to those described in this specification with reference to the wind turbine blade 1000.

A wind turbine blade 1000B (see FIG. 1) may be similar to the wind turbine blade 1000 in all aspects except for the parts of a date palm tree used in forming the wind turbine blade 1000B. That is, the wind turbine blade 1000A is formed by using date palm tree trunk surface fibers instead of the leaflets used to form the wind turbine blade 1000.

A method of forming the wind turbine blade 1000B may be the same as the method described in this specification for forming the wind turbine blade 1000, with the exception of substituting the leaflets with a plurality of date palm tree trunk surface fibers. Therefore, the description below will focus on the differences between forming of the turbine blade 1000B and forming the turbine blade 1000. All other forming steps not described in detail below may be presumed to be the same as corresponding steps described with referent to the forming of the turbine blade 1000.

The material used for forming the first layers 510, 610, the third layers 530, 630, and the fifth layers 550, 650 of the turbine blade 1000B is date palm tree trunk surface fibers. The fibers can be removed from the exterior of the trunk of date palm trees. For example, as date palm tree leaves are cut, an end portion of each leaf, close to the exterior surface of the trunk remains in place, generally speaking. These are fibers that connect the outside of the tree trunk with the base of the leaves (and may also include a portion of the base of the leaf). This fibrous material is not a structural component of the trunk itself. Therefore, the palm tree trunk surface fibers can be removed from a date palm tree without harming the tree.

The obtained trunk surface fibers may be washed and dried as described elsewhere in this specification. However, the washed and dried trunk surface fibers are then cut to a size ranging from about 10 mm to about 30 mm in length.

All other aspects of forming the first and second shells of the wind turbine blade 1000B and connecting the first and second shells of the wind turbine blade 1000B to one another may be the same as or similar to those described in this specification with reference to the wind turbine blade 1000.

Wind turbine blades 1000, 1000A, 1000B have been produced in a small scale (e.g., up to about 3.5 feet long) in accordance with the method of the present disclosure. The blades 1000, 1000A, 1000B have been tested under cyclic tension-tension loads, cyclic compression-compression loads, flap-wise bending, elastic bucking and bending moment associated with gravitational loads. The blades 1000, 1000A, 1000B have passed all of said structural engineering tests.

Therefore, it is contemplated that the scaling up of the wind turbine blades 1000, 1000A and 1000B to the dimension of blades used by commercial wind turbines, which can be in the range of about 100 meters long, will produce blades that pass structural engineering tests when formed in accordance with the teachings of this specification.

Wind turbine blades produced in accordance with the teachings of the present disclosure reduce the amount of non-renewable material used in making the blades, reduce the emission of carbon associated with the manufacturing of the blades, and reduce the amount of non-renewable material that ends up in a landfill.

The date palm tree material described in this specification is generally a byproduct of the palm date farming industry. As such, the palm date material can be obtained at no cost (such as in Saudi Arabia) or at a low cost. Therefore, wind turbine blades manufactured in accordance with the teachings of this specification have a low cost.

Moreover, the collection of date tree material as described in this specification is generally not considered harmful to the donor trees.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A wind turbine blade, comprising;
   a first shell, the first shell having a first exterior side surface, a first interior side surface, and a first mating side surface connecting the first interior and first exterior side surfaces to one another;
   a second shell, the second shell having a second exterior side surface, a second interior side surface, and a second mating side surface connecting the second interior and second exterior side surfaces to one another;
   wherein the first and second mating side surfaces are connected to one another, the first and second exterior side surfaces define an exterior of the wind turbine blade, and the first and second interior side surfaces define an interior chamber of the wind turbine blade,
   wherein the first and second shells include date palm tree material and epoxy, and
   wherein the date palm tree material included in the first shell is the same as the date palm tree material included in the second shell,
   wherein the first shell includes:
   a first layer of date palm tree material, the first layer of date palm tree material defining the first exterior side surface of the first shell or being proximate to the first exterior side surface of the first shell;
   a second layer of epoxy formed on the first layer of date palm tree material;
   a third layer of date palm tree material formed on the second layer of epoxy;
   a fourth layer of epoxy formed on the third layer of date palm tree material; and
   a fifth layer of date palm tree material formed the fourth layer of epoxy, the fifth layer of date palm tree material defining the first interior side surface of the first shell or being proximate to the first interior side surface of the first shell and distal to the first exterior side surface of the first shell,
   wherein a weight ratio of date palm tree material included in the first layer of date palm tree material and epoxy included in the second layer of epoxy ranges from about 50:100 to about 150:150.

2. The wind turbine blade of claim 1, wherein a weight ratio of the date palm tree material included in the first, third and fifth layers of date palm tree material to the epoxy included in the second and fourth layers of epoxy included in the first shell ranges from about 150:200 to about 450:300.

3. The wind turbine of claim 1, wherein a weight ratio of resin to hardener in the second layer of epoxy in the first shell is 2:1, 3:2 or 5:3.

4. The wind turbine of claim 1, wherein a weight ratio of resin to hardener in the fourth layer of epoxy in the first shell is 2:1, 3:2 or 5:3.

5. The wind turbine of claim 1, wherein the first layer of date palm tree material, the third layer of date palm tree material and the fifth layer of date palm tree material in the first shell are formed of a same kind of date palm tree material.

6. The wind turbine of claim 5, wherein the date palm tree material includes one selected from the group consisting of a plurality of date palm tree leaflet pieces, a plurality of date palm tree root pieces, and a plurality of date palm tree trunk surface fibers.

7. The wind turbine of claim 6, wherein, when the date palm tree material includes the plurality of date palm tree leaflet pieces, the plurality of date palm tree leaflet pieces range from about 2 to about 3 cm in length.

8. The wind turbine of claim 6, wherein, when the date palm tree material includes the plurality of date palm tree root pieces, the plurality of date palm tree root pieces range from about 0.5 to about 1 mm in length.

9. The wind turbine of claim 1, wherein a weight ratio of date palm tree material included in the third layer of date palm tree material and epoxy included in the fourth layer of epoxy ranges from about 50:100 to about 150:150.

10. The wind turbine of claim 9, wherein a weight ratio of date palm tree material included in the fifth layer of date palm tree material and epoxy included in the fourth layer of epoxy ranges from about 50:100 to about 150:150.

11. The wind turbine blade of claim 1, wherein the second shell includes:
    a first layer of date palm tree material, the second layer of date palm tree material defining the second exterior side surface of the second shell or being proximate to the second exterior side surface of the second shell;
    a second layer of epoxy formed on the first layer of date palm tree material;
    a third layer of date palm tree material formed on the second layer of epoxy;
    a fourth layer of epoxy formed on the third layer of date palm tree material; and
    a fifth layer of date palm tree material formed on the fourth layer of epoxy, the fifth layer of date palm tree material defining the second interior side surface of the second shell or being proximate to the second interior side surface of the second shell and distal to the second exterior side surface of the second shell.

12. The wind turbine of claim 11, wherein a weight ratio of date palm tree material included in the first layer of date palm tree material of the second shell and epoxy included in the second layer of epoxy of the second shell ranges from about 50:100 to about 150:150.

13. The wind turbine of claim 11, wherein a weight ratio of the date palm tree material included in the first, third and fifth layers of date palm tree material of the second shell to the epoxy included in the second and fourth layers of epoxy of the second shell ranges from about 150:200 to about 450:300.

14. The wind turbine of claim 11, wherein a weight ratio of resin to hardener in the second layer of epoxy in the second shell is 2:1, 3:2 or 5:3.

15. The wind turbine of claim 11, wherein a weight ratio of resin to hardener in the fourth layer of epoxy in the second shell is 2:1, 3:2 or 5:3.

16. The wind turbine of claim 11, wherein the first layer of date palm tree material, the third layer of date palm tree material and the fifth layer of date palm tree material in the second shell are formed of a same kind of date palm tree material.

17. The wind turbine of claim 16, wherein the date palm tree material in the second shell includes one selected from the group consisting of a plurality of date palm tree leaflet pieces, a plurality of date palm tree root pieces, and a plurality of date palm tree trunk surface fibers.

18. The wind turbine of claim 17, wherein, when the date palm tree material in the second shell includes the plurality of date palm tree leaflet pieces, the plurality of date palm tree leaflet pieces range from about 2 to about 3 cm in length.

19. The wind turbine of claim 17, wherein, when the date palm tree material in the second shell includes the plurality of date palm tree root pieces, the plurality of date palm tree root pieces range from about 0.5 to about 1 mm in length.

\* \* \* \* \*